United States Patent [19]
Fresmann

[11] 3,731,555
[45] May 8, 1973

[54] VALVE CONTROL LINKAGE
[75] Inventor: Karl Heinz Fresmann, Waterloo, Iowa
[73] Assignee: Deere & Company, Moline, Ill.
[22] Filed: Apr. 7, 1972
[21] Appl. No.: 242,163

[52] U.S. Cl. ....................74/491, 74/100 R, 74/520, 180/77 R
[51] Int. Cl. ..............................................G05g 1/00
[58] Field of Search ....................74/491, 520, 100 R

[56] References Cited
UNITED STATES PATENTS
2,884,803   5/1959   Willis................................74/520 X Primary Examiner—Milton Kaufman
Attorney—H. Vincent Harsha et al.

[57] ABSTRACT

A valve rigidly mounted on a tractor chassis is controlled, through an over center linkage, by a lever pivotally mounted on a cab which is resiliently mounted on the tractor chassis. The over center linkage and a pair of springs which act on the over center linkage and lever prevent the valve from sensing or being affected by relative movement between the cab and chassis.

7 Claims, 3 Drawing Figures

VALVE CONTROL LINKAGE

BACKGROUND OF THE INVENTION

The present invention relates generally to control linkage for a hydraulic valve, and more particularly relates to a valve control linkage system which operates between a valve rigidly mounted on a tractor chassis and a lever pivotally mounted on a tractor cab which is resiliently mounted on the tractor chassis to prevent the valve from being affected by the relative movement between the cab and chassis.

It has become common practice to resiliently mount cabs on tractor chassis so that the vibrations in the chassis are not passed on to the cab and tractor operator. This has presented problems in designing controls which will not be affected by the relative movement between the cab and chassis. For example, most agricultural tractors are provided with a power take-off which is selectively engaged and disengaged hydraulically. With the valve mounted on the tractor chassis and the control lever for the valve mounted on the cab, a straight linkage between the control lever and valve would transmit relative movement between the valve and lever to the valve and cause erratic control. Various linkage systems have been designed to prevent relative movement between the cab and chassis from being transferred to the valve, but to date these linkage systems have been extremely complicated and expensive to manufacture.

SUMMARY OF THE INVENTION

The principal object of the present invention is to provide a linkage system which operates between a control valve rigidly mounted on a tractor chassis and a control lever pivotally mounted on a cab which is resiliently mounted on the chassis to prevent relative movement between the cab and chassis from being transferred to the valve.

A further object of the present invention is to provide a linkage system which operates between a valve rigidly mounted on a tractor chassis and a control lever pivotally mounted on a cab which is resiliently mounted on the tractor chassis to move the valve to either side of a neutral position to first and second open positions upon movement of the control lever, and to prevent relative movement between the cab and chassis from affecting the movement or position of the valve.

The above objects and additional objects and advantages of the present invention will become apparent along with the construction of a preferred embodiment of the invention from a reading of the following detailed description when taken in conjunction with the accompanying drawing.

DESCRIPTION OF THE PREFERRED EMBODIMENT

Figure 3:
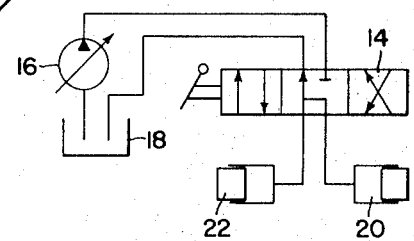

Referring to the drawing, a portion of a tractor chassis is indicated by the numeral 10 and a portion of an operator's station or tractor cab is indicated by the numeral 12. Although not illustrated in the drawing, the operator's station or cab 12 is resiliently mounted on the chassis 10 in any suitable manner such as with rubber blocks. A valve 14 is rigidly mounted upon the tractor chassis and is of the type movable to opposite sides of a neutral position to first and second open positions. As illustrated in FIG. 3, the valve 14 is part of the hydraulic system which includes a pump 16, a fluid reservoir 18 and a pair of hydraulic actuators 20 and 22. For exemplary purposes, the actuator 20 will be considered as a power take-off clutch actuator and the actuator 22 will be considered as a power take-off brake actuator. As can be seen in FIG. 3, both actuators are connected with the reservoir when the valve 14 is in a neutral position, the clutch actuator 20 is connected with the pump 16 and the brake actuator 22 is connected to the reservoir 18 when the valve 14 is moved to the right to a first side of the neutral position, and the brake actuator 22 is connected with the pump 16 and the clutch actuator 20 is connected with the reservoir 18 when the valve 14 is moved to the left to a second side of the neutral position.

Figure 1:
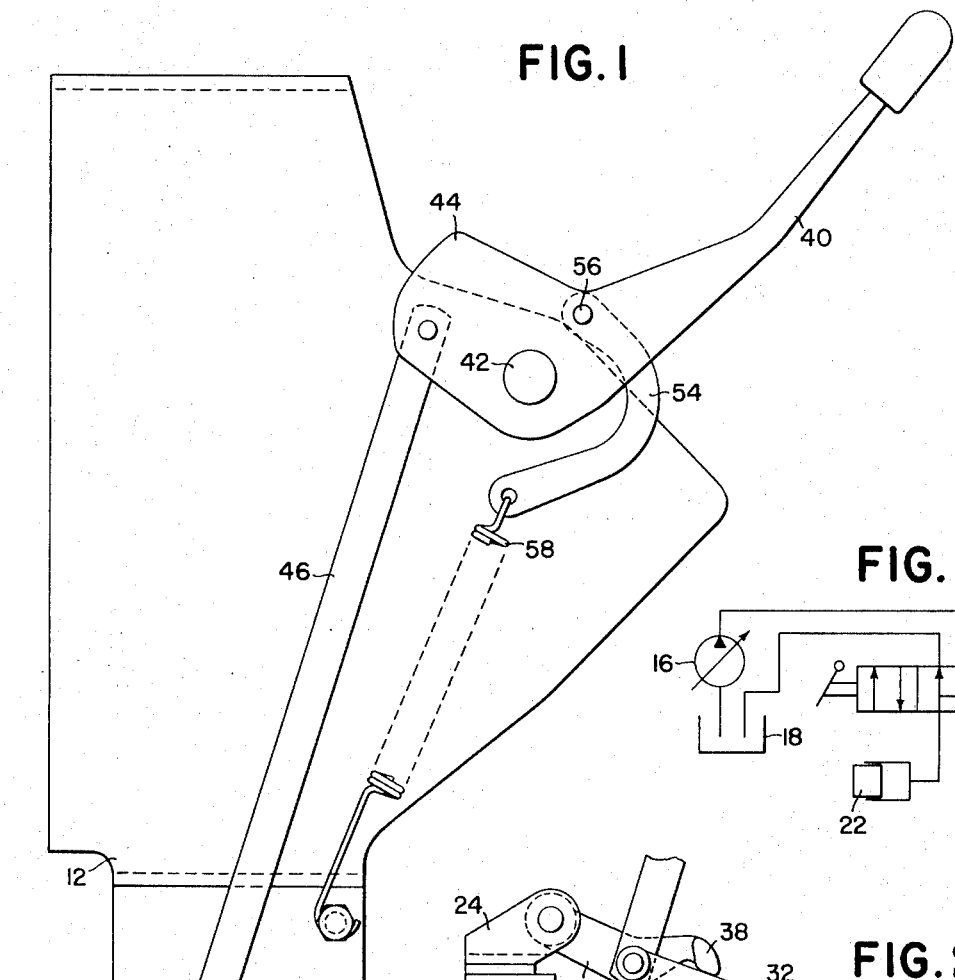
FIG. 1 is a side elevational view of the control linkage according to the present invention, the solid lines showing the positions of the parts when the valve is in the neutral position and the broken lines illustrating the position of the parts when the valve is in one on position.
Figure 2:
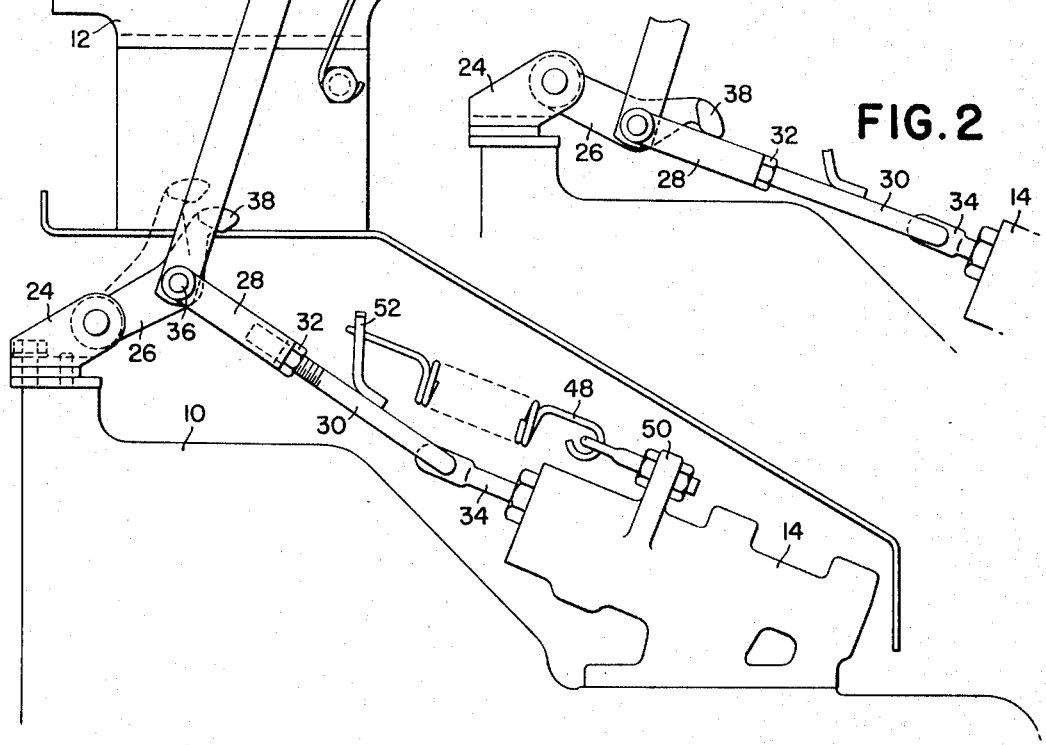
FIG. 2 is a side elevational view of the over center linkage illustrating the position of the parts when the valve is in an additional on position; and, FIG. 3 is a schematic illustration of an exemplary hydraulic system in which the valve illustrated in FIG. 1 is utilized.

For the purpose of controlling the movement of the valve 14, a bracket 24 is mounted on the chassis 10 and a link 26 is pivotally mounted on the bracket 24. A second link of adjustable length includes a U-shaped clevis portion 28 having a threaded aperture in its bight and a threaded rod 30 extending through the aperture provided in the clevis 28 and secured in adjusted position by a lock nut 32. An end portion of the threaded rod 30 extends at an angle of 90° with respect to the length of the rod 30 and extends through an aperture provided in a reciprocating control member 34 for the valve 14. The link 26 is pivoted between the legs of the clevis 28 by a pivot pin 36 so that the link 26 and the adjustable length link form an over center linkage acting between the bracket 24 and valve control member 34 to control the movement of the valve. The relative positions of the clevis and threaded rod 30 are adjusted so that the valve 14 is in a neutral position when the over center linkage is in the position illustrated in solid lines in FIG. 1, is in a first open position to interconnect the clutch actuator 20 with the pump 16 when the over center linkage is in the over center position illustrated in FIG. 2, and is in a second open position to interconnect the brake actuator 22 with the pump 16 when the over center linkage is in the position illustrated by the broken lines in FIG. 1. The link 26 includes a headed extension 38 which engages one leg of the clevis 28 as illustrated in FIG. 2 to determine the over center position of the linkage.

A clutch control lever 40 is pivotally mounted on the cab 12 by a pivot shaft 42 and includes an integral crank arm 44. A rigid link 46 has one end pivotally connected to the crank arm 44 and its other end pivotally connected between the legs of the clevis 28 by the pivot pin 36 so that movement of the control lever 40 in a counterclockwise direction as viewed in FIG. 1 moves the over center linkage to the position illustrated in FIG. 2 and the valve 14 to its first open position, and movement of the lever 40 in a clockwise direction will move the over center linkage to the two positions illustrated in FIG. 1 and the valve 14 to its neutral and second open positions.

A relatively heavy positioning spring 48 has one end anchored to a lug 50 integral with the control valve 14 and its opposite end anchored to an ear 52 welded or otherwise suitably secured to the threaded rod 30. The end of the spring 48 anchored to the ear 52 extends through an aperture provided in the ear 52 and engages the back of the ear. The mounting of the spring 48 to the lug 50 is adjusted so that it is just under tension when the valve 14 is in a neutral position.

A generally half-circular link 54 has one end pivotally connected to the control lever 40 above the shaft 42 by a pivot pin 56 and a lever return spring 58 is anchored between the other end of the link 54 and the cab 12. The lever return spring 58 is of a size that is insufficient to produce a force on the lever 40 which will cause the spring 48 to stretch. As is apparent from FIG. 1, the connection between the link 54 and control lever 40 moves with the control lever 40 so that the line of force of the spring 58 moves from one side of the pivot shaft 42 to the other so as to provide a yieldable force on the lever 40 which changes directions depending upon the position of the lever 40. The generally half-circular shape of the link 54 permits the connection between the link 54 and lever 40 to move from one side to the other of the shaft 42 without interference between the shaft 42 and link 54.

The operation of the above-described valve and control linkage is as follows. When the valve 14 and control linkage is in the neutral position illustrated in solid lines in FIG. 1, the spring 58 urges the lever 40 in a clockwise direction but is not capable of moving the valve 14 from the neutral position due to its inability to stretch the spring 48. Relative movement between the cab 12 and chassis 10 will cause small movements of the lever 40 but will not cause any movement of the valve control member 34 since the spring 58 maintains the linkage tight against the spring 48.

If the operator wants to engage the power take-off, he moves the lever 40 in a counterclockwise direction so that the over center linkage assumes the position illustrated in FIG. 2. In this position, the over center linkage is rigid between the bracket 24 and valve control member 34, both of which are rigidly mounted on chassis, so that movements of the cab 12 with respect to the chassis 10 will again not affect the position of the control member 34. As the lever 40 is moved in the counterclockwise direction, the spring 48 will slide in the aperture provided in the ear 52 and the line of force of the spring 58 moves over center so that the spring 58 urges the lever 40 counterclockwise. Relative movement between the cab 12 and chassis 10 will cause small movements of the lever 40 against and with the force of the spring 58.

To disengage the power take-off clutch, the lever 40 is moved in a clockwise direction so that the over center linkage moves from the position illustrated in FIG. 2 back to the position illustrated in solid lines in FIG. 1 and the line of force of the spring 58 moves to the opposite side of shaft 42. At this point, the valve 14 is in a neutral position. Continued movement of the lever 40 in a clockwise direction moves the over center linkage to the position illustrated in broken lines in FIG. 1 and moves the valve 14 to its second open position so that the brake actuator 22 is connected with the pump 16. This quickly stops the power take-off. As soon as the operator releases the lever 14, the spring 48 returns the over center linkage to the position illustrated in solid lines in FIG. 1 and the valve 14 to the neutral position. The springs 48 and 58 will retain the valve 14 in its neutral position until the operator again engages the power take-off by movement of the lever 40 in the counterclockwise direction.

From the foregoing description of construction and operation, it can be seen that the present invention provides an extremely simple and efficient linkage which acts between the control valve rigidly mounted on a tractor chassis and a lever pivotally mounted on a cab which is resiliently mounted on the tractor chassis to control the movements of the valve to either side of a neutral position and prevents any relative movement between the cab and chassis from affecting the movement or position of the control valve.

Having described one preferred embodiment of the invention, various modifications within the spirit and scope of the invention will become obvious to those skilled in the art and can be made without departing from the underlying principles of the invention. Therefore, the invention should not be limited by the specific disclosure, but only by the following claims.

I claim:

1. In combination: a tractor having a chassis; an operator's station resiliently mounted on the chassis for limited movement relative thereto; a valve having a body rigidly mounted on the chassis and including a control member movable between open and neutral positions; a bracket rigidly mounted on the chassis; a pair of rigid links, one pivotally connected to the control member and the other to the bracket, pivotally interconnected at a point offset from the centerline through the pivotal connections between the one link and the control member and the other link and the bracket when the control member is in the neutral position so that movement of the interconnection between the links to an on-center position moves the control member to the open position and additional movement of the interconnection between the pair of links to a just over-center position locks the control member in the open position; a control lever pivotally mounted on the operator's station; and a rigid link pivotally connected to the control lever and the pair of links to move the interconnection between the pair of links between the just over-center position and the offset position upon movement of the lever between first and second positions.

2. A combination as set forth in claim 1 wherein abutment means carried by one of the pair of links is engageable with the other of the pair of links to limit movement of the interconnection between the pair of links to the just over-center position.

3. A combination as set forth in claim 2 wherein tension spring means is anchored between the control lever and the operator's station and has a line of force movable to opposite sides of the pivot axis of the control lever as the control lever is moved between its first and second positions to yieldably retain the control lever in its first and second positions.

4. In combination: a tractor having a chassis; an operator's station mounted on the chassis; a valve having a body mounted on the chassis and including a control member movable to opposite sides of a neutral position to first and second open positions; a bracket mounted on the chassis; a pair of pivotally interconnected links pivotally connected to the control member and bracket to form an over center control linkage assembly with the interconnection between the links being in a first offset position with respect to the centerline through the pivotal connections between the links and the control member and the bracket when the control member is in the neutral position so that movement of the interconnection between the links in a one direction to an over-center position moves the control member to and locks the control member in the first open position and movement of the interconnection between the pair of links in an opposite direction to a second offset position moves the control member to the second open position; a valve control lever pivotally mounted on the operator's station for movement to first and second sides of a neutral position; and link means interconnecting the lever and over center linkage assembly to move the interconnection between the pair of links from the first offset position to the over-center position and second offset position upon movement of the lever to the first and second sides respectively, of its neutral position.

5. A combination as set forth in claim 4 wherein spring means acting on the over center linkage assembly yieldably resists movement of the lever to the second side of its neutral position and returns the lever from the second side of its neutral position to its neutral position.

6. A combination as set forth in claim 5 wherein the spring means has a lost-motion connection with the over center linkage assembly which affords relative movement between the assembly and spring means as the lever is moved between its neutral position and the first side of its neutral position.

7. A combination as set forth in claim 6 wherein tension spring means is anchored between the control lever and operator's station and has a line of force movable to opposite sides of the pivot axis of the control lever as the control lever is moved between its neutral position and the first side of its neutral position to yieldably retain the control lever in its neutral position and to the first side of its neutral position.

* * * * *